United States Patent [19]

Hagedorn

[11] 3,852,294
[45] Dec. 3, 1974

[54] BIS-QUATERNARY PYRIDINIUM SALTS

[75] Inventor: Ilse Hagedorn, Freiburg, Germany

[73] Assignee: Merck Patent Gesellschaft mit beschrankter Haftung, Darmstadt, Germany

[22] Filed: Dec. 20, 1972

[21] Appl. No.: 316,929

Related U.S. Application Data

[63] Continuation-in-part of Ser. No. 755,752, Aug. 27, 1968, Pat. No. 3,773,775.

[52] U.S. Cl... 260/296 M, 260/294.8 R, 260/295 S, 424/263, 424/266
[51] Int. Cl............................................. C07d 31/40
[58] Field of Search...... 260/296 M, 294.8 R, 295 S

[56] References Cited
FOREIGN PATENTS OR APPLICATIONS
930,040   7/1963   Great Britain ................. 260/296 M

OTHER PUBLICATIONS

Chem. Abstracts, Vol. 60, Number 3, Page 2905f–2905g, Feb. 3, 1964.

*Primary Examiner*—Alan L. Rotman
*Attorney, Agent, or Firm*—Millen, Raptes & White

[57]        ABSTRACT (2-hydroxyiminomethylpyridinium-1-methyl)-4-hydroxyiminomethyl-pyridinium-1-methyl) ether salts are useful as pharmaceuticals for treating and alleviating symptoms of poisoning caused by phosphorus-containing plant-protective agents and war gases, specifically soman.

2 Claims, No Drawings

BIS-QUATERNARY PYRIDINIUM SALTS

This is a continuation-in-part of application Ser. No. 755,752, filed Aug. 27, 1968, now U.S. Pat. No. 3,773,775.

SUMMARY OF THE INVENTION

Quaternary ammonium pyridinium salts of the formula

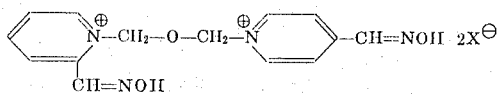

wherein

X is an equivalent of a mono- or polyvalent anion; counteract the symptoms of poisoning caused by modern phosphorus-containing plant-protective agents and war toxicants, particularly soman. Those compounds wherein the anion is such that the quaternary salts I are not pharmaceutically acceptable may be converted by well-established procedures into therapeutically useful quaternary salts I. The therapeutically useful salts can be administered orally, parenterally or topically to mammals poisoned by a phosphorus-containing compound of the type noted. The daily dosage varies from compound to compound and is dependent upon the severity of the poisoning being treated. Suitable doses are from 50 milligrams (mg) to 20 grams (g.) and can be administered as a single dose.

Compounds I are prepared, e.g. by reacting a compound of one of the formulas:

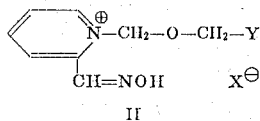

and

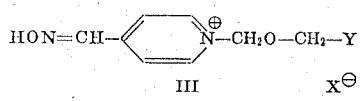

wherein

X has the above-noted meaning; and

Y is a residue which can be substituted by a compound of Formula IV or V with a corresponding compound of the formula:

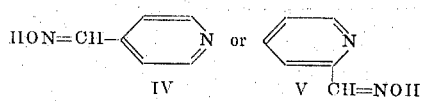

the products are precipitated and crystallized according to established procedures.

It is an object of this invention to provide pharmaceutically acceptable compounds which are administrable either enterally, parenterally, or topically for alleviating and overcoming symptoms of poisoning caused by phosphorus-containing compounds, particularly phosphoric acid esters, more particularly soman.

A further object is to provide compounds of Formula I for this purpose.

Another object is to provide intermediates II and III for the preparation of compounds I.

A still further object is to provide a pharmaceutical preparation containing an effective dosage of a compound of Formula I in addition to conventional carriers and additives, particularly wherein the compound of Formula I is [(2-hydroxy-iminomethyl)-pyridinium-(1)-methyl]-[(4-hydroxyiminomethyl)-pyridinium-(1)-methyl]-ether dichloride (Ia). It is also an object of the present invention to provide a pharmaceutical preparation containing an effective dosage, e.g. 50 mg to 20 g of Ia in addition to conventional carriers and additives.

Still further objects are apparent from the description and examples which follow.

DETAILED DISCUSSION OF THE INVENTION

Of the quaternary pyridinium salts of Formula I, the preferred embodiments are:
[(2-hydroxy-iminomethyl)-pyridinium-(1)-methyl]-[(4-hydroxy-iminomethyl)-pyridinium-(1)-methyl]-ether dichloride (Ia); and [(2-hydroxy-iminomethyl)-pyridinium-(1)-methyl]-[(4-hydroxy-iminomethyl-pyridinium-(1)-methyl]-ether difluoride.

In the preparation of compounds I, any compound II is reacted with pyridine-4aldoxime (IV) or any compound III is reacted with pyridine-2-aldoxime (V). In compounds II and III substituent Y is preferably a halogen, e.g. chloro and bromo, or $R-SO_2-O-$, such as alkylsulfonyloxy, particularly lower alkylsulfonyloxy having from 1 to 4 carbon atoms, e.g. methylsulfonyloxy, or arylsulfonyloxy, preferably monocarbocyclic arylsulfonyloxy, e.g. phenylsulfonyloxy, R is a hydrocarbon residue which is either aliphatic, aromatic or cycloaliphatic.

The reaction is preferably effected in a solvent, such as dimethylformamide, $CHCl_3$ or acetonitrile, in which case the substituent Y, e.g. a halogen, appears in the obtained final product as anion $X^-$. The solvents are not limited to these, however, and other solvents, such as dichloromethane, dioxane, tetrahydrofuran or nitrobenzene, can be used alternatively.

The reaction is conducted within a temperature range between $-10°C$ and $200°C$, preferably between $+20°C$ and $+80°C$. Normally, the reaction products of Formula I separate from the reaction mixture and are purified by recrystallization from, for example, lower alkanols, such as ethanol or isopropanol.

Furthermore, a compound of Formula VI

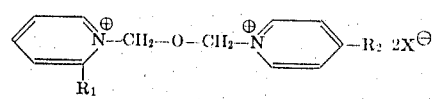

wherein
each of $R_1$ and $R_2$ is CHO; or
$R_1$ is CH=NOH and $R_2$ is CHO; or
$R_1$ is CHO and $R_2$ is CH=NOH,
obtainable, for example, by reacting pyridine-2-aldehyde with [(4-hydroxy-iminomethyl)-pyridinium-(1)-methyl]-chloromethyl-ether chloride in dimethyl formamide, can be oximized to compounds of Formula I with hydroxylamine hydrochloride, with the addition of the equivalent amount of alkali, such as NaOH or KOH, preferably in an aqueous or aqueous-ethanolic solution at temperatures between $-20°C$ and $+100°C$, as described in greater detail in Houben-Weyl, "Methoden der Organischen Chemie", Vol. VII/1 (1954), pp. 471–474. However, it is likewise possible to employ solvent mixtures of water with dimethyl formamide, dioxane, dimethyl sulfoxide, acetonitrile or tetrahydrofuran. Working-up is advantageously effected by concentrating the reaction mixture gently by evaporation under reduced pressure and isolating the reaction product of Formula I by extraction with isopropanol.

Furthermore, the anion X $^-$ in a compound of formula I can be replaced by another anion X $^-$. Thus the anion X $^-$ can represent a chlorine ion or hydroxyl ion and can subsequently be exchanged, in accordance with conventional methods, for another anion, e.g. converted by treatment with perchloric acid into the corresponding bis-perchlorate or by the effect of sodium methanesulfonate into the corresponding bis-methanesulfonate.

For pharmaceutically acceptable quaternary salts of Formula I the anion X may be that of an organic acid, e.g. tartaric acid; inorganic acid, e.g. hydrochloric acid, hydrofluoric acid, hydrobromic acid and sulfuric acid; monobasic acid, e.g. an alkanesulfonic acid, such as methane-sulfonic acid; dibasic acid, e.g. succinic acid; tribasic acid, e.g. phosphoric acid and citric acid; saturated acid, e.g. acetic acid; ethylenically unsaturated acid, e.g. maleic acid and fumaric acid; or that of an aromatic acid, e.g. salicylic acid and an arylsulfonic acid, such as benzenesulfonic acid. The selected anion X does not nullify the therapeutic properties of compounds I; selection is made, rather, on therapeutic acceptability. The novel compounds of general Formula I are normally crystalline, water-soluble salts.

Intermediates of Formula II or III are obtained by reacting pyridine-2-aldoxime or pyridine-4-aldoxime with disubstituted ethers of Formula VII

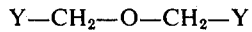

VI wherein

Y has the above-indicated meaning,
preferably in inert solvents, such as chloroform, dichloromethane, acetonitrile, nitromethane, dimethylsulfoxide, dimethylformamide, dioxane or tetrahydrofuran. Preferably, the reaction components are employed in a molar ratio of 1 : 1.2, and the process is conducted at temperatures of up to 80°C. In general, the reaction products are obtained in crystalline phase and obtained in a sufficiently pure form for further reactions by post-washing with an inert solvent.

The novel compounds of Formula I can be processed to all forms of preparations customary for pharmaceutical purposes. For example, pills, tablets, dragees, solutions, emulsions, syrups and injection solutions can be produced therefrom. Suitable pharmaceutical excipients are those organic substances which are adapted for parenteral, enteral or topical application and which do not react with the novel compounds, such as water, vegetable oils, polyethylene glycols, gelatin, lactose, amylose, magnesium stearate, talc, vaseline, cholesterol, etc. Especially suitable for parenteral application are solutions, preferably oily or aqueous solutions, as well as suspensions or emulsions. For enteral application tablets or dragees can be employed; for topical application salves or creams which can be sterilized or mixed with auxiliary substances, such as preservatives, stabilizers or wetting agents, or salts for influencing the osmotic pressure, or with buffer substances, are preferred.

Each of the pharmaceutically active compounds of this invention may be, e.g. incorporated, for oral administration, in a tablet as the sole active ingredient. A typical dosage tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well known in the art, employing the necessary amounts of conventional granulating liquids, e.g. alcohol SD-30 and purified water. An exemplary tabletting formulation for the instant active compounds is:

|  | Parts |
|---|---|
| Compound of Example 1 | 50 |
| Tragacanth | 2 |
| Lactose | 39.5 |
| Corn starch | 5 |
| Talcum | 3 |
| Magnesium stearate | 0.5 |
| Alcohol SD-30 | q.s. |
| Purified water | |

The pharmacological effects of the new compounds of formula I can be shown in tests with laboratory animals such as mice, rats, guinea-pigs, rabbits, cats, dogs or monkeys.

The new compounds of formula I are particularly useful against soman poisoning. It is known that soman — in contrast to the other two nerve gases (tabun and sarin)—cannot be "detoxicated" by the oximes usually applied as cholinesterase reactivators (cf. Biochemical Pharmacology, 14. 73—77, 1965).

In contrast to the commercial preparation toxogonin (active agent: bis-[4-hydroxy-iminomethyl-pyridinium-(1)-methyl]-ether dichloride), the isomeric [(2-hydroxy-iminomethyl)-pyridinium-(1)-methyl]-[(4-hydroxy-iminomethyl)-pyridinium-(1)-methyl]-ether dichloride (Ia) is capable of controlling an intoxication induced by the administration of multiple LD 50 of soman to dogs under simultaneous cholinolytic therapy.

Other than toxogonin, $I_a$ completely restores the function of the motor end plates in soman intoxication.

Experiments were performed to compare the antidote activities of Ia with those of toxogonin against poisoning by soman as follows:

Experimental animals were guinea pigs of both sexes weighing 200 – 400 g. For determination of the esterase activity in plasma and erythrocytes 1 ml of blood was withdrawn from each animal by heart puncture under mild ether anaesthesia. Thus 24 hours before the beginning of the test the individual normal activity (= 100 %) was determined for each animal of the plasma esterase (in the benzoyl choline test according to KALOW et al., Canad. J. Biochem. 35. 339 – 346, 1957) and of the erythrocyte esterase (with the method according to HESTRIN, J. biol. Chem. 180. 249 – 261, 1949). On the day of the test the animals received an intraperitoneal injection of 4 mg/kg of atropine. 15 minutes later the animals were subcutaneously intoxicated with 0.05 mg/kg of soman. After 1 hour, 6 hours, 24 hours and 8 days 1 ml. of blood was withdrawn from each of the surviving animals to determine the esterase activities. The antidotes tested were injected intramuscularly in each case immediately following the subcutaneous injection of soman. The results are given in the following table (Table 1):

The reaction product is 2.6 g. of crude [(2-hydroxy-iminomethyl)-pyridinium-(1)-methyl]-[(4-hydroxy-iminomethyl)-pyridinium-(1)-methyl]-ether dichloride, exhibiting, after recrystallization from methanol/isopropanol, a decomposition point of 177–178°C.

Table 1

Effect of compound and toxogonin (50 mg/kg each intramuscularly) on the course of the cholinesterase (ChE) activity in plasma (P) and erythrocytes (E) after soman intoxication in guinea pigs. 15 minutes before the intoxication all the animals received intraperitoncally 4 mg/kg of atropine. The ChE activity is given in % of the normal activity with confidence limits for p = 0.05.

| | ChE | No. of animals | 1 hour | | 6 hours | | 24 hours | | 8 days | |
|---|---|---|---|---|---|---|---|---|---|---|
| | | | activity | surviving | activity | surviving | activity | surviving | activity | surviving |
| Soman s.c. (control) | P | 12 | 4 % (2–6) | 12 of 12 | % (10–16) | 12 of 12 | 33 % (26–40) | 7 of 12 | 95 % (86–103) | 5 of 12 |
| | E | 12 | 7 % (2–12) | | 16 % (7–26) | | 42 % (27–57) | | 94 % (87–101) | |
| Soman s.c. +compound Ia 50 mg/kg i.m. | P | 4 | 46 % (38–53) | 4 of 4 | 68 % (54–83) | 4 of 4 | 81 % (74–88) | 4 of 4 | 96 % (91–101) | 4 of 4 |
| | E | 4 | 31 % (18–43) | | 53 % (39–68) | | 61 % (46–77) | | 91 % (85–96) | |
| Soman s.c. + toxogonin 50 mg/kg i.m. | P | 10 | 4 % (2–5) | 10 of 10 | 12 % (7–17) | 5 of 10 | 46 % | 3 of 10 | — | 0 of 10 |
| | E | 10 | 1 % (0,1–2) | | 24 % (21–27) | | 27 % | | — | |

As set forth in Table 1 the activity of the claimed 2-hydroxy-imino-methyl compound Ia closest structurally to that of the reference bis-4-hydroxyimino-methyl compound (toxogonin) was compared with that of the reference compound. As set forth in Table 1, the activities of these compounds as antidotes for lethal injections of soman was determined. As is known, soman is a potent cholinesterase inhibitor whose lethal dose in man may be as low as 0.01 mg/kg. See the Merck Index, 8th Edition, page 970.

At a dose level of 50 mg/kg. intramuscularly, the reference compound ("toxogonin"), although a highly potent antidote for acetylcholinesterase inhibiting nerve gases, did not protect the test animals against the lethal effects of the injected soman and none of the test animals survived 8 days after the injection thereof. In contrast thereto, the claimed compound closest structurally to that of the reference compound (Compound Ia) was a highly effective antidote, achieving 100% survival.

It follows from these results that the present compound Ia shows very good antidotal activities in vivo whereas the known compound toxogonin shows no activity.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In 150 ml of dry chloroform 1.22 g. of pyridine-4-aldoxime is dissolved in the warm state and mixed with 2.4 g. of [(2-hydroxy-iminomethyl-pyridinium-(1)-methyl]-chloromethylether chloride. Under vigorous stirring and exclusion of moisture, the suspension is maintained at the boiling point for 5 hours. Thereafter, the suspension is vacuum filtered while still warm, and washed twice, once with dry alcohol and once with diethyl ether.

The starting material is prepared as follows:

Under heating, 3.05 g. of pyridine-2-aldoxime are dissolved in 15 ml of dry chloroform. With stirring and under exclusion of moisture, 3.16 g. of α,α-dichlorodimethyl ether in 5 ml of dry chloroform are slowly added dropwise at 40°–50°C (about 30 drops per minute). After 10 minutes, the solution becomes cloudy. The agitation is continued for 4 hours at 45°C, and the reaction mixture is allowed to stand overnight.

The precipitate is vacuum filtered, washed with chloroform and dried under vacuum at 60°C, thus yielding 4.78 g. of [(2-hydroxy-iminomethyl)-pyridinium-(1)-methyl]-chloromethyl-ether chloride having a decomposition starting point of 122°C, melting at 133°C.

This crude product is sufficiently clean for further reactions.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A pharmaceutically acceptable quaternary salt of the formula

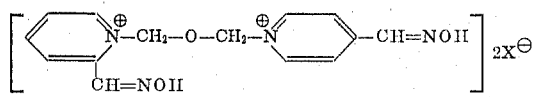

wherein
X is an equivalent of a mono- or polyvalent anion.
2. A salt according to claim 1 wherein X is Cl.